United States Patent
Smelyansky et al.

(10) Patent No.: US 9,942,407 B2
(45) Date of Patent: Apr. 10, 2018

(54) PREVENTION OF CALL LOOPS FOR WHOLESALE VOIP TRAFFIC TERMINATION

(71) Applicants: Vladimir Smelyansky, Glenview, IL (US); Victor Grinberg, Buffalo Grove, IL (US)

(72) Inventors: Vladimir Smelyansky, Glenview, IL (US); Victor Grinberg, Buffalo Grove, IL (US)

(73) Assignee: XCast Labs, Inc., Los Angeles, CA (US)

(*) Notice: Subject to any disclaimer, the term of this patent is extended or adjusted under 35 U.S.C. 154(b) by 0 days.

(21) Appl. No.: 14/340,188

(22) Filed: Jul. 24, 2014

(65) Prior Publication Data
US 2015/0029895 A1    Jan. 29, 2015

Related U.S. Application Data

(60) Provisional application No. 61/857,984, filed on Jul. 24, 2013.

(51) Int. Cl.
*H04M 3/54* (2006.01)
*H04M 7/00* (2006.01)

(52) U.S. Cl.
CPC ......... *H04M 3/545* (2013.01); *H04M 7/0084* (2013.01); *H04M 2201/18* (2013.01)

(58) Field of Classification Search
None
See application file for complete search history.

(56) References Cited

U.S. PATENT DOCUMENTS

| | | | |
|---|---|---|---|
| 2006/0285499 A1* | 12/2006 | Tzeng | H04L 45/18 370/249 |
| 2007/0230360 A1* | 10/2007 | Nishi | H04L 41/0677 370/249 |
| 2008/0018452 A1* | 1/2008 | McCarthy | G08B 25/08 340/531 |
| 2009/0067423 A1* | 3/2009 | Visser | H04L 47/10 370/389 |
| 2009/0304165 A1* | 12/2009 | Chung | H04M 3/36 379/112.06 |

(Continued)

*Primary Examiner* — Donald Mills
(74) *Attorney, Agent, or Firm* — Smith, Gambrell & Russell, LLP

(57) ABSTRACT

A method, system, and computer program product for providing call loop detection and prevention for VoIP SIP based wholesale traffic termination when multiple carriers are involved in handling the same phone call is provided. A method of detecting a call loop includes receiving an originated call, determining whether an origination number of the originated call is a valid phone number, when the origination phone number is invalid, determining a number of calls in a Provisional State with an invalid origination number and the same destination number that were started during a time interval, when the origination phone number is valid, determining a number of calls with the same origination number and the same destination number that were started, but not answered, during the time interval, and when the number of calls per time interval exceeds a threshold for the number of calls, determining that a call loop has been detected.

9 Claims, 4 Drawing Sheets

(56) References Cited

U.S. PATENT DOCUMENTS

| | | | |
|---|---|---|---|
| 2014/0270125 A1* | 9/2014 | Khan | H04M 3/436 379/189 |
| 2014/0280992 A1* | 9/2014 | Khan | H04L 67/143 709/228 |
| 2014/0317190 A1* | 10/2014 | Mendiratta | H04L 67/14 709/204 |

* cited by examiner

US 9,942,407 B2

PREVENTION OF CALL LOOPS FOR WHOLESALE VOIP TRAFFIC TERMINATION

CROSS-REFERENCE TO RELATED APPLICATIONS

This application claims the benefit of U.S. Provisional Application No. 61/857,984, filed Jul. 24, 2013.

BACKGROUND OF THE INVENTION

1. Field of the Invention

The present invention relates to a method and system for preventing call loops for wholesale VoIP traffic when multiple carriers are involved in handling the same phone call.

2. Description of the Related Art

The existence of call loops is well known in the phone industry. For example: A has call forwarding set to call B, B has call forwarding set to call C, and C has forwarding set to call A. As soon as somebody calls A the call goes into an infinite loop. The Public Switched Telephone Network (PSTN) has relatively slow call setup (seconds) and that loop can be propagated only up to some limited level. By the time that the loop would become dangerous, the caller would have hung up the phone and broken the loop. This is also typically the case when the loop is created by end user devices, not Telco switches.

However, the situation is different in the case of Voice over Internet Protocol (VoIP). With call speeds reaching thousands of calls per second, the loop can reach hundreds of thousands of calls before it is terminated. In addition, there is no transitional header in the SIP message that can indicate that call is not a new call, but actually was triggered by another call.

In addition, unlike the traditional PSTN network, VoIP carriers have a much higher level of interconnectivity and it is quite common that carrier A provides services to carrier B as well as using carrier B to terminate the service, quite often into the same area. Even more, multiple carriers can be involved in the traffic exchange and the resulting loop can be quite long.

One of the limitations of SIP messaging is the absence of a permanent header that would be preserved between different carriers to uniquely identify the call. The existing Call-ID can be replaced by any SIP User Agent (any intermediate carrier could, and usually does, have one) and is not preserved and no alternative header is provided.

As a result, a need arises for a technique to prevent call loops for wholesale VoIP traffic when multiple carriers are involved in handling the same phone call.

SUMMARY OF THE INVENTION

A method, system, and computer program product for providing flexible call loop detection and prevention for VoIP SIP based wholesale traffic termination when multiple carriers are involved in handling the same phone call is provided.

According to an embodiment of the invention a computer-implemented method of detecting a call loop of phone traffic is provided. When call comes to the system, the system checks if there is another call with the same destination and the same or similar origination number exists in not answered state. It also checks how many not completed calls and/or determines a number of calls in a Provisional State (calls that are still in provisional negotiation phase as described in RFC 3261 and RFC 3262) with the same destination or same or similar origination number were initiated in the specified time interval and based on that makes a decision if it is a call loop and if the next call is to be rejected.

According to an embodiment of the invention, a method of detecting a call loop at a computer system comprising a processor, a memory storing program instructions and data and accessible by the processor, and program instructions stored in the memory for performing the method, the method comprising receiving an originated call, determining whether an origination phone number of the originated call is a valid phone number, when the origination phone number is invalid, determining a number of calls in a Provisional State with an invalid origination number and the same destination number that were started during a time interval, when the origination phone number is valid, determining a number of calls with the same origination number and the same destination number that were started, but not answered, during the time interval, and when the number of calls per time interval exceeds a threshold for the number of calls, determining that a call loop has been detected.

The method may further comprise when a call loop is detected, terminating the originated call. The method may further comprise when a call loop is detected, providing an error code. The error code may be a SIP default value or a customer specific value.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A method and system for providing flexible loop detection and prevention for VoIP SIP based wholesale traffic termination when multiple carriers are involved in handling the same phone call is provided. This technique protects carriers from potential network overloads and serious billing issues. For example, if a call was looping and the last incarnation of the loop was connected, all instances of the call become billable, which means that instead of a single charge, a charge multiplied by the loop size would occur.

Figure 1:
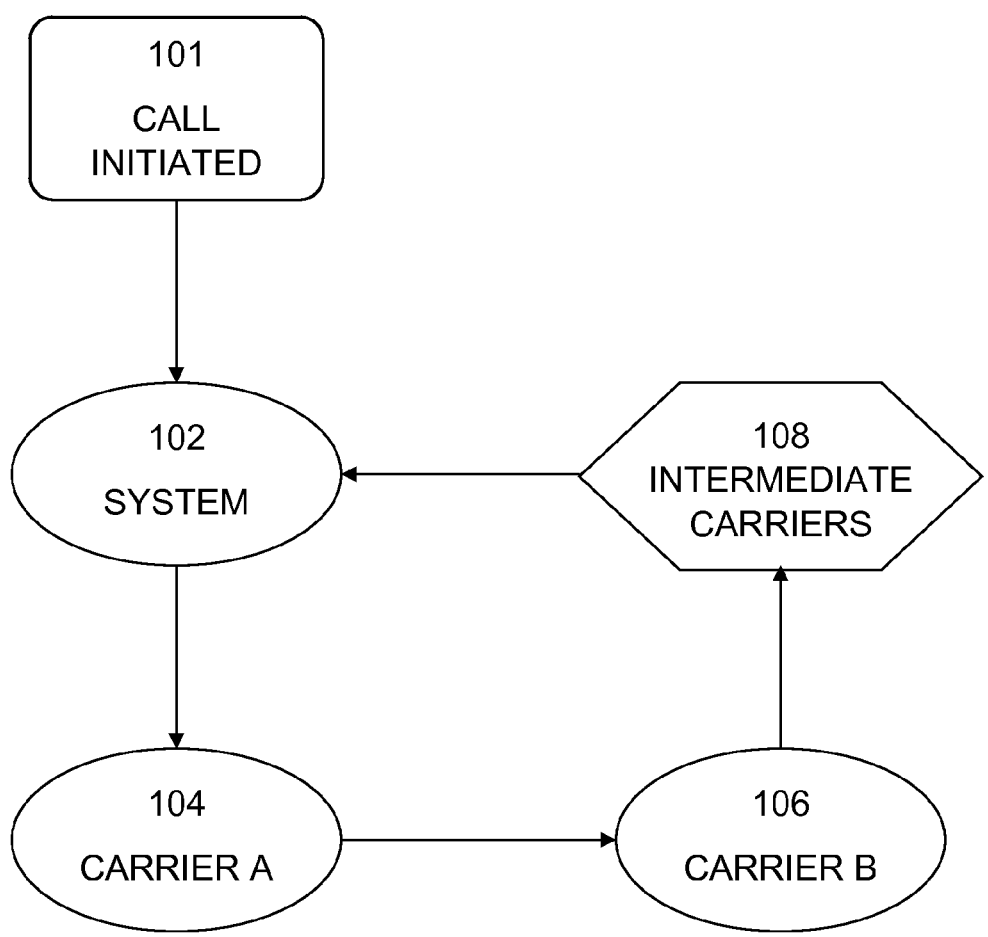
FIG. 1 is an exemplary flow diagram of a call loop.

An example of how a call loop can happen is shown in FIG. 1. A call is initiated 101 and is routed to the system 102. System 102 routes the call to Carrier A 104. Carrier A 104 routes the call to another Carrier B 106, which may directly, or indirectly by involving intermediate carriers 108 eventually return the call to system 102. It is possible for call loops to reach over half a million calls.

Figure 2:
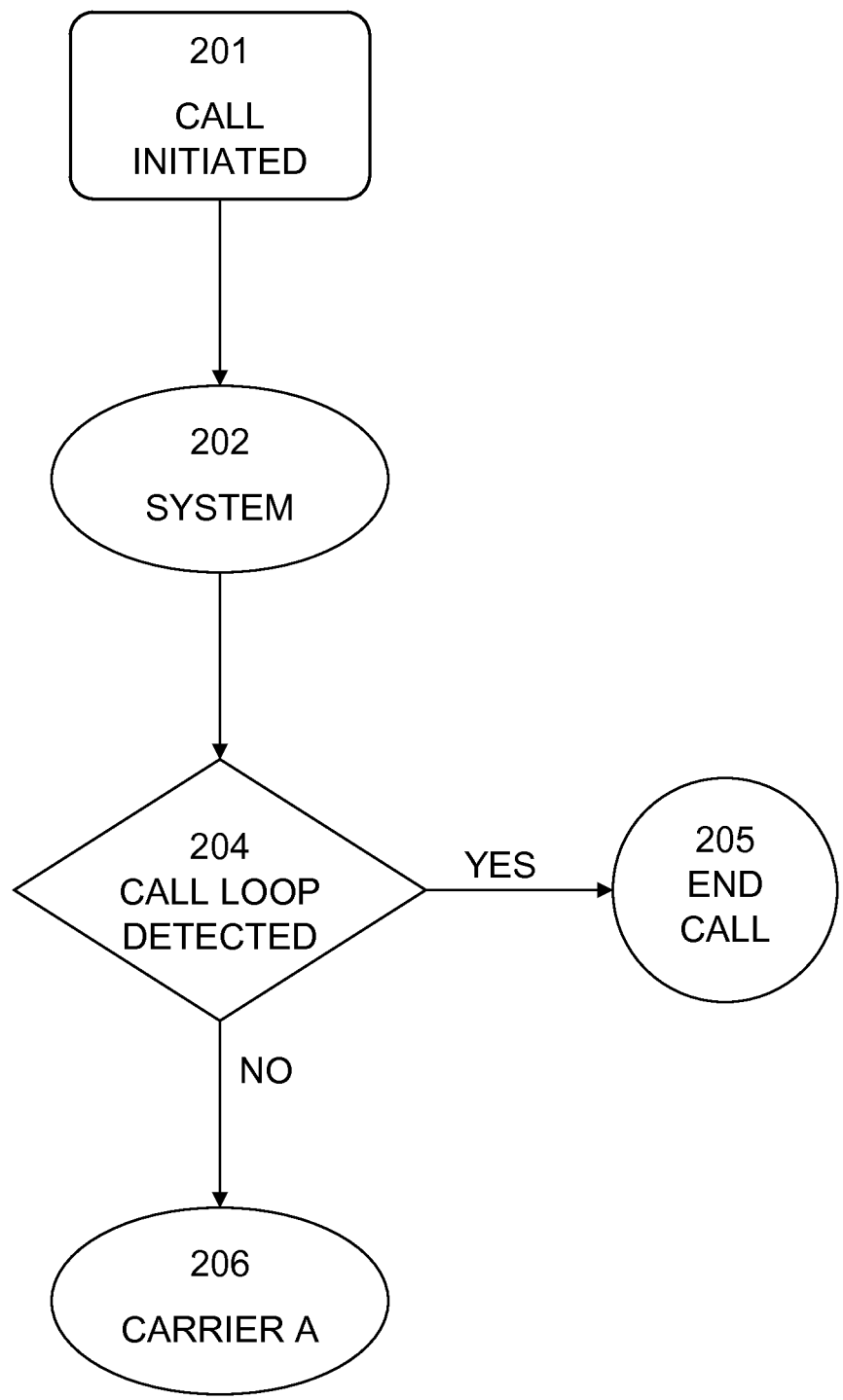
FIG. 2 is an exemplary flow diagram of action that may be taken when a call loop is detected.

FIG. 2 shows action that may be taken when a call loop is detected. A call is initiated 201 and is routed to the present system 202. At that point system 202 determines if a call loop is detected 204. If a call loop is detected, the call is ended or aborted 205. If a call loop is not detected, the call sent to the Carrier A 206 or which may be a VoIP or PSTN carrier network.

Figure 3:
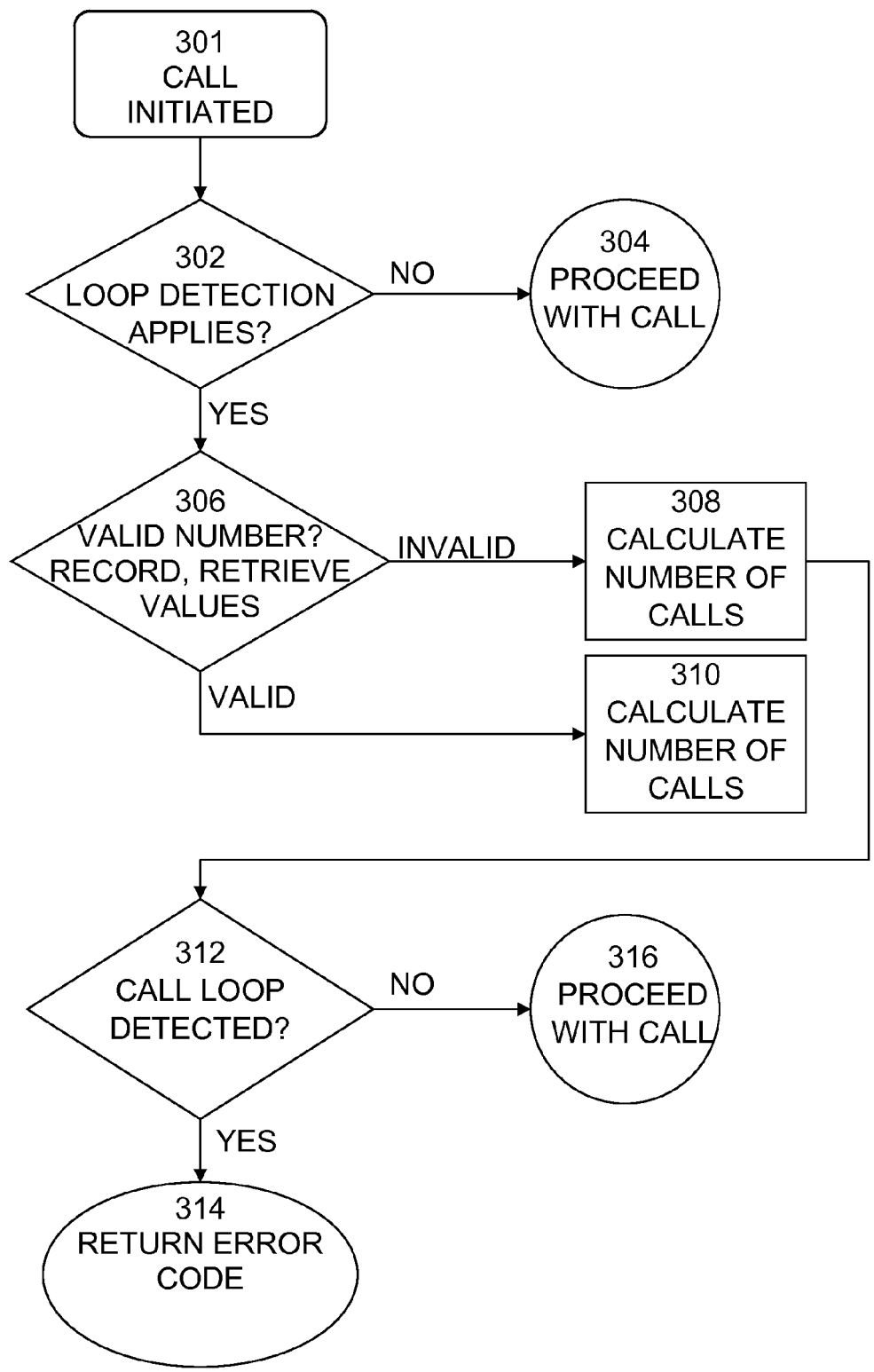
FIG. 3 is an exemplary flow diagram of a call loop detection process.

FIG. 3 shows the operation of a call loop detector. A call is initiated 301 and routed to the present system. The system checks if call loop detection applies to the particular customer who initiated the call or to whom the call is destined 302. If loop detection does not apply, the call is processed using the standard business rules 304.

If loop detection applies, the call is routed 306 to a call loop detector. The call loop detector checks if the origination number is a valid phone number, such as a phone number assigned according to the North American Numbering Plan (NANP), and records the result 306. After that, it retrieves preconfigured values for loop detection—time interval (1 second for example) and a threshold for the number of calls (3 for example).

If the origination phone number is invalid, the call loop detector determines a number of calls in a Provisional State (calls that are still in provisional negotiation phase as described in RFC 3261 and RFC 3262) with any Invalid origination number and the same destination number that were started, but not answered, during the specified time interval 308.

If the origination number is a valid number, the call loop detector determines the number of calls with the same origination number and the same destination number that were started, but not answered, during the specified time interval 310.

If the number of calls per time interval exceeds the threshold for the number of calls, the loop is detected 312. The system then may terminate the call and return to the customer providing an error code that could be, for example, a SIP default value or a customer specific value 314.

If number of calls doesn't exceed the threshold value, assumption that it is not a loop is made and system proceeds with the normal call setup process 316.

For example, an error code that may be returned to the customer could be SIP 482 Loop Detected response or specified on per a customer basis.

Figure 4:
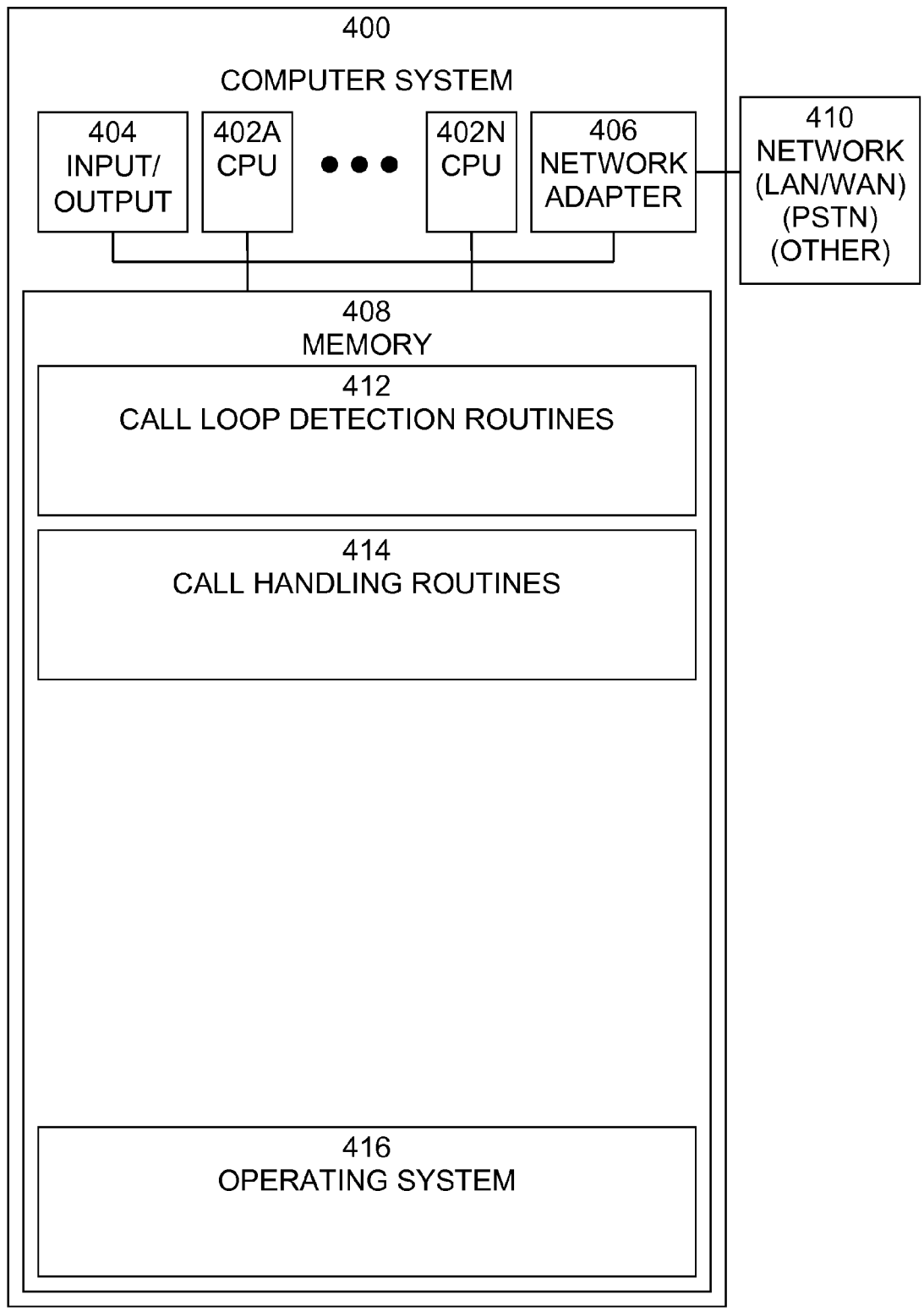
FIG. 4 is an exemplary block diagram of a computer system in which the processes shown in FIGS. 2 and 3 may be implemented.

An exemplary block diagram of a computer system 400, in which the processes shown in FIGS. 2 and 3 may be implemented, is shown in FIG. 4. Computer system 400 is typically a programmed general-purpose computer system, such as a personal computer, workstation, server system, and minicomputer or mainframe computer. Computer system 400 includes one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL XEON® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present invention also contemplates embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces device 400 with a network 410. Network 410 may be any type of network, such as public or proprietary LAN or WAN, including, but not limited to the Internet, and/or the Public Switched Telephone Network (PSTN), and/or any other public or private telecommunications network.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EE-PROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 varies depending upon the function that computer system 400 is programmed to perform. In the example shown in FIG. 4, memory contents that would be included in a personal computer are shown. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 4, memory 408 includes call loop detection routines 412, call handling routines 414, and operating system 432. Call loop detection routines 412 detect the presence of call loops as shown in FIG. 3. Call handling routines 414 handle calls in response to the detection or non-detection of a call loop as shown in FIGS. 2 and 3. Operating system 416 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, Linux®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while aspects of the present invention have been described in the context of a fully functioning data processing system, those of ordinary skill in the art will appreciate that the processes of the present invention are capable of being distributed in the form of a computer program product including a computer-readable medium of instructions. Examples of non-transitory computer-readable media include storage media, include, but are not limited to, floppy disks, hard disk drives, CD-ROMs, DVD-ROMs, RAM, and flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of handling calls in a communications system at a computer system communicatively connected to the communications system, the computer system comprising a processor, a memory storing program instructions and data and accessible by the processor, and program instructions stored in the memory for performing the method, the method comprising:
   determining whether a call loop is present based on a combination of whether a received originated call is in a Provisional State, an origination phone number of the call, origination phone numbers of other received calls, and the destination phone numbers of other received calls by:
   determining whether the received originated call is in a Provisional State and whether an origination number of the originated call is a valid phone number in accordance with the North American Numbering Plan;
   when the origination phone number of the received originated call is invalid, determining a number of other calls in a Provisional State having an invalid origination number and the same destination number that were started during a time interval;
   when the origination phone number of the received originated call is valid, determining a number of calls with the same origination number as the received originated call and the same destination number as the received originated call that are in a Provisional State, during the time interval;
   when the number of calls per time interval with a same valid origination number and a same destination number or an invalid origination number and the same destination number and are in a Provisional State exceeds a threshold for the number of calls, determining that a call loop has been detected; and
   when a call loop is detected, terminating the originated call.

2. The method of claim 1, further comprising:
   when a call loop is detected, providing an error code.

3. The method of claim 2, wherein the error code is SIP default value or a customer specific value.

4. A system for handling calls in a communications system, the communications system comprising a processor, a memory storing program instructions and data and accessible by the processor, and program instructions stored in the memory for performing:
   determining whether a call loop is present based on a combination of whether a received originated call is in a Provisional State, an origination phone number of the call, origination phone numbers of other received calls, and the destination phone numbers of other received calls by:
   determining whether the received originated call is in a Provisional State and whether an origination number of the originated call is a valid phone number in accordance with the North American Numbering Plan;
   when the origination phone number of the received originated call is invalid, determining a number of other calls in a Provisional State having an invalid origination number and the same destination number that were started during a time interval;
   when the origination phone number of the received originated call is valid, determining a number of calls with the same origination number as the received originated call and the same destination number as the received originated call that are in a Provisional State, during the time interval;
   when the number of calls per time interval with a same valid origination number and a same destination number or an invalid origination number and the same destination number and are in a Provisional State exceeds a threshold for the number of calls, determining that a call loop has been detected; and
   when a call loop is detected, terminating the originated call.

5. The system of claim 4, further comprising:
   when a call loop is detected, providing an error code.

6. The system of claim 5, wherein the error code is SIP default value or a customer specific value.

7. A computer program product for handling calls in a communications system including a processor, the computer program product comprising a non-transitory, computer-readable medium and program instructions recorded on the medium, that when executed by the processor, perform:
   determining whether a call loop is present based on a combination of whether a received originated call is in a Provisional State, an origination phone number of the call, origination phone numbers of other received calls, and the destination phone numbers of other received calls by:
   determining whether the received originated call is in a Provisional State and whether an origination number of the originated call is a valid phone number in accordance with the North American Numbering Plan;
   when the origination phone number of the received originated call is invalid, determining a number of other calls in a Provisional State having an invalid origination number and the same destination number that were started during a time interval;
   when the origination phone number of the received originated call is valid, determining a number of calls with the same origination number as the received originated call and the same destination number as the received originated call that are in a Provisional State, during the time interval;
   when the number of calls per time interval with a same valid origination number and a same destination number or an invalid origination number and the same destination number and are in a Provisional State exceeds a threshold for the number of calls, determining that a call loop has been detected; and when a call loop is detected, terminating the originated call.

8. The computer program product of claim 7, further comprising:

when a call loop is detected, providing an error code.

9. The computer program product of claim 8, wherein the error code is SIP default value or a customer specific value.

* * * * *